US008244608B2

(12) United States Patent
Wood (10) Patent No.: US 8,244,608 B2
(45) Date of Patent: Aug. 14, 2012

(54) TAKEOFF LIST PALETTE FOR GUIDING SEMI-AUTOMATIC QUANTITY TAKEOFF FROM COMPUTER AIDED DESIGN DRAWINGS

(75) Inventor: Andrew Wood, San Francisco, CA (US)

(73) Assignee: AUTODESK, Inc., San Rafael, CA (US)

( * ) Notice: Subject to any disclaimer, the term of this patent is extended or adjusted under 35 U.S.C. 154(b) by 214 days.

(21) Appl. No.: 12/181,269

(22) Filed: Jul. 28, 2008

(65) Prior Publication Data
US 2010/0023432 A1    Jan. 28, 2010

(51) Int. Cl.
*G06F 17/50* (2006.01)
*G06F 7/60* (2006.01)
(52) U.S. Cl. ............... 705/34; 703/1; 705/7.35; 705/29
(58) Field of Classification Search ............... 705/7, 10, 705/37, 34, 28, 39, 9, 8; 715/234, 854, 211, 715/212; 703/1
See application file for complete search history.

(56) References Cited

U.S. PATENT DOCUMENTS

| | | | | |
|---|---|---|---|---|
| 5,189,606 A * | 2/1993 | Burns et al. | ................... | 705/7.23 |
| 5,510,998 A * | 4/1996 | Woodruff et al. | ............. | 716/102 |
| 5,625,827 A * | 4/1997 | Krause et al. | ................... | 715/234 |
| 5,701,403 A * | 12/1997 | Watanabe et al. | ............. | 345/419 |
| 5,907,850 A * | 5/1999 | Krause et al. | ................... | 715/234 |
| 6,324,508 B1 * | 11/2001 | Finney | ........................... | 704/246 |
| 6,658,387 B2 * | 12/2003 | Finney | ........................... | 704/270 |
| 6,922,701 B1 * | 7/2005 | Ananian et al. | ....................... | 1/1 |
| 7,283,975 B2 * | 10/2007 | Broughton | ...................... | 705/28 |
| 7,685,013 B2 * | 3/2010 | Gendler | ........................ | 705/7.23 |
| 7,720,703 B1 * | 5/2010 | Broughton | ................... | 705/7.23 |
| 7,752,065 B2 * | 7/2010 | Buzz | ............................ | 705/7.23 |
| 2001/0037190 A1 * | 11/2001 | Jung | ................................ | 703/1 |
| 2002/0026343 A1 * | 2/2002 | Duenke | ......................... | 705/8 |
| 2004/0068515 A1 * | 4/2004 | Hallman | ....................... | 707/102 |
| 2004/0098338 A1 * | 5/2004 | Uehara et al. | ................... | 705/42 |
| 2004/0186763 A1 * | 9/2004 | Smith | ............................... | 705/9 |
| 2004/0205519 A1 * | 10/2004 | Chapel et al. | ................. | 715/502 |
| 2004/0215572 A1 * | 10/2004 | Uehara et al. | ................... | 705/64 |
| 2005/0050483 A1 * | 3/2005 | Keller et al. | ...................... | 716/4 |

(Continued)

OTHER PUBLICATIONS

Drogemuller, Robin., Tucker, Selwyn. Automating the extraction of quantities. QUT Digital Repository: http://eprints.qut.edu.au/27197.*

(Continued)

*Primary Examiner* — Matthew Gart
*Assistant Examiner* — Olusegun Goyea
(74) *Attorney, Agent, or Firm* — Patterson & Sheridan, LLP.

(57) ABSTRACT

Embodiments of the present invention enable users to efficiently guide semi-automatic quantity takeoff from computer aided design (CAD) drawings by selecting multiple drawing objects and/or multiple instances of drawing objects as the target of subsequent commands. In some embodiments, the user supplements an automated portion of a quantity takeoff from a CAD drawing by selecting one or more drawing objects in a takeoff palette. The user defines the dimension (e.g., linear) to quantify and optionally the parameter to be quantified (e.g., length) for the selected drawing objects simultaneously. The quantity takeoff engine quantifies the instances associated with the selected drawing objects, performs takeoff calculations, and updates a workbook accordingly. To further facilitate the analysis of the CAD drawing, the user simultaneously selects one or more drawing objects and/or one or more instances of drawing objects to view and organize (e.g., filter, search, etc.) by properties in a properties palette.

20 Claims, 8 Drawing Sheets

U.S. PATENT DOCUMENTS

| | | | |
|---|---|---|---|
| 2005/0177507 A1* | 8/2005 | Bandych et al. | 705/40 |
| 2005/0203718 A1* | 9/2005 | Carek et al. | 703/1 |
| 2005/0261930 A1* | 11/2005 | Litz | 705/1 |
| 2006/0044307 A1* | 3/2006 | Song | 345/419 |
| 2006/0095372 A1* | 5/2006 | Venkatasubramanian et al. | 705/40 |
| 2006/0095373 A1* | 5/2006 | Venkatasubramanian et al. | 705/40 |
| 2006/0111956 A1* | 5/2006 | Whitesage | 705/8 |
| 2006/0184433 A1* | 8/2006 | Gron et al. | 705/30 |
| 2007/0174027 A1* | 7/2007 | Moiseyev | 703/1 |
| 2007/0192677 A1* | 8/2007 | O'Leary | 715/503 |
| 2007/0288364 A1* | 12/2007 | Gendler | 705/39 |
| 2008/0004844 A1* | 1/2008 | Kefford et al. | 703/1 |
| 2008/0015823 A1* | 1/2008 | Arnold et al. | 703/1 |
| 2008/0177656 A1* | 7/2008 | Sun et al. | 705/39 |
| 2008/0243654 A1* | 10/2008 | Wernze et al. | 705/34 |
| 2008/0269942 A1 | 10/2008 | Free | |
| 2009/0030835 A1* | 1/2009 | Burns et al. | 705/37 |
| 2009/0070071 A1* | 3/2009 | Wood | 703/1 |
| 2009/0070072 A1 | 3/2009 | Wood | |
| 2009/0070073 A1 | 3/2009 | Wood | |
| 2009/0078757 A1* | 3/2009 | Hanson et al. | 235/380 |
| 2009/0089194 A1* | 4/2009 | Mathis et al. | 705/34 |
| 2009/0198539 A1* | 8/2009 | Buzz | 705/7 |
| 2009/0216726 A1* | 8/2009 | Muthaiah et al. | 707/3 |
| 2009/0319421 A1* | 12/2009 | Mathis et al. | 705/40 |
| 2010/0023432 A1* | 1/2010 | Wood | 705/29 |

OTHER PUBLICATIONS

International Search Report. Nov. 7, 2008.
Office Action in U.S. Appl. No. 12/138,318, mailed Nov. 22, 2010.

* cited by examiner

TAKEOFF LIST PALETTE FOR GUIDING SEMI-AUTOMATIC QUANTITY TAKEOFF FROM COMPUTER AIDED DESIGN DRAWINGS

BACKGROUND OF THE INVENTION

1. Field of the Invention

The present invention generally relates to computer software. More specifically, the present invention relates to techniques for guiding semi-automatic quantity takeoff data from computer aided design drawings.

2. Description of the Related Art

The term computer aided design (CAD) generally refers to a broad variety of computer-based tools used by architects, engineers, and other construction and design professionals. CAD applications may be used to construct computer models representing virtually any real-world construct. Commonly, CAD applications are used to compose computer models and drawings related to construction projects. For example, a CAD application may be used to compose a three-dimensional (3D) model of a house or an office building. Once composed, these CAD models are often used to generate a variety of two-dimensional (2D) and 3D views such as plan, profile, section, and elevation views. Additionally, such models may be used to generate architectural, construction, engineering, and other documentation related to the construction project.

A common requirement of construction projects is to generate an estimate of the cost of the project from the building drawings. This estimate can then be used as part of the bidding process or as part of the pricing process. The term "quantity takeoff" is generally referred to as process of estimating the quantities of materials needed to construct a project based on the project drawings and specifications. The quantities involved in quantity takeoff may include numerical counts, such as the number of doors and windows in a project, but may also include other quantities such as the volume of concrete or the lineal feet of wall space. The rest of the cost estimate of a project entails determining the types of materials that will be used as well as the unit costs of those materials.

Today, the quantity takeoff process is typically performed manually. For example, a project manager may use a printout, a pen, and a clicker to manually count objects depicted in a set of construction documents. The project manager may physically mark each instance of an object in a CAD drawing, using the clicker to maintain an instance count. A digitizer is often used for taking measurements from the printout. The project manager or cost engineer evaluates each drawing element individually, identifies the material associated with the element, identifies and quantifies the appropriate dimension of the element, calculates the element cost, and adds the element cost to the overall cost estimate.

One drawback to this approach is that it has proven to be error-prone. Also, this approach is both labor intensive and time consuming. Moreover, if the project design is modified after the original cost estimate is calculated, the takeoff process may need to be repeated. If the takeoff process is not repeated after design changes, accumulated inaccuracies in the cost estimate may adversely affect the bidding or pricing process. Another drawback to the manual approach is that it is difficult and expensive to accurately assess the cost impact of different design choices.

As the foregoing illustrates, what is needed is a more effective and flexible technique for estimating the cost of a construction project and, more particularly, for generating quantity takeoff data.

SUMMARY OF THE INVENTION

One embodiment of the present invention sets forth a method for performing quantity takeoff computations. The method includes the steps of receiving a selection of a drawing object, where at least one instance of the selected drawing object is included in a computer-aided design (CAD) drawing, determining a takeoff object associated with the selected drawing object, generating a quantified value for each instance of the selected drawing object based on a takeoff property associated with the takeoff object, and computing a cost estimate for each instance of the selected drawing object based on the quantified value for the instance and cost data included in the takeoff object.

One advantage of the disclosed method is that, by enabling the user to select multiple drawing objects and/or instances of drawing objects and subsequently apply commands to all of the selections simultaneously, the quantity takeoff engine and the graphical user interface streamline the takeoff design process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
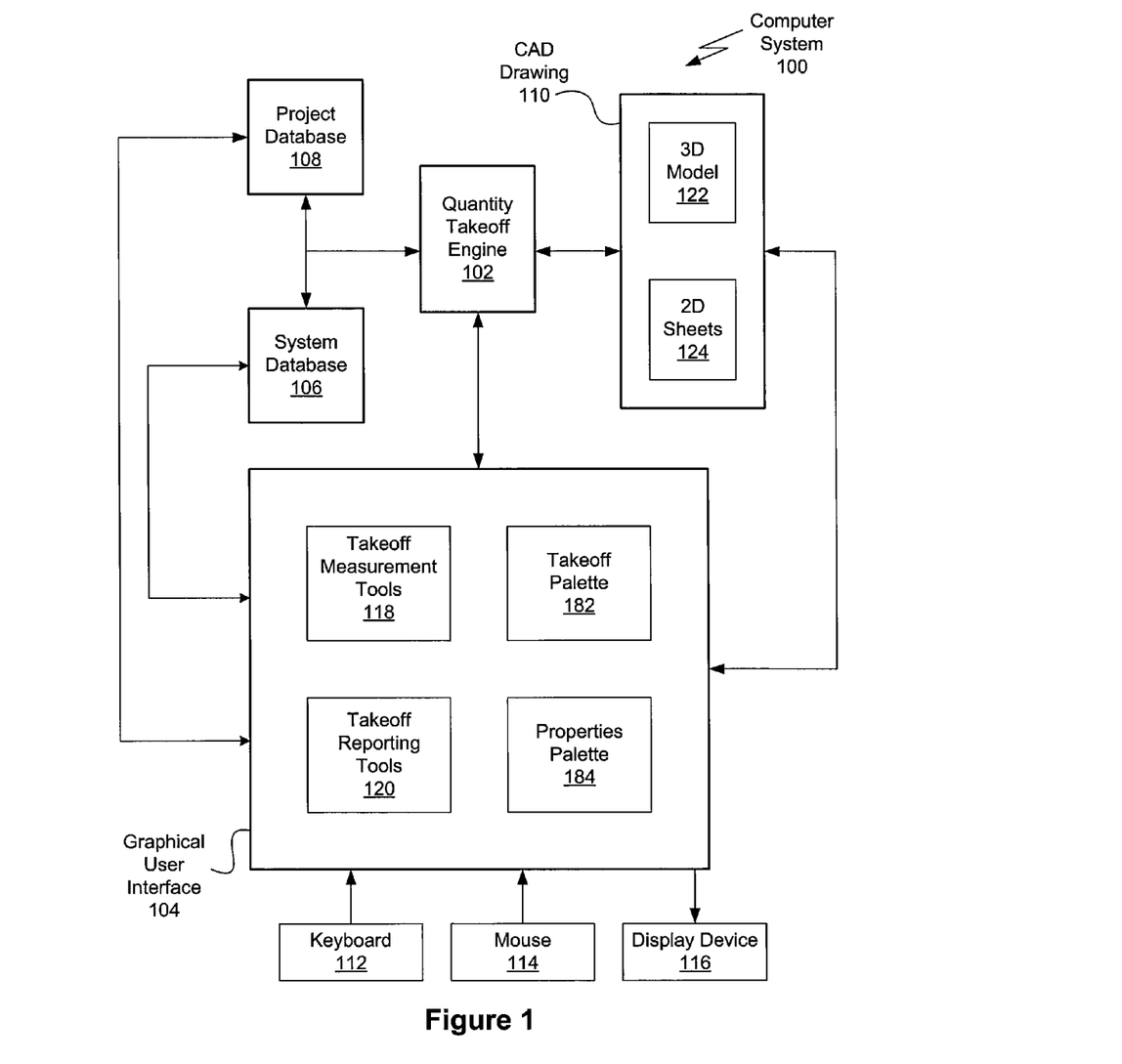
FIG. 1 is a conceptual diagram of a computer system in which one or more aspects of the invention may be implemented.

FIG. 1 is a conceptual illustration of a computer system 100 in which embodiments of the invention may be implemented. As shown, the computer system 100 is configured to store takeoff data, perform takeoff measurements, generate takeoff reports, and display design and takeoff properties. In one embodiment, the components illustrated in computer system 100 include computer software applications executing on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in computer system 100 may be software applications executing on distributed systems communicating over computer networks including local area networks or large, wide area networks, such as the Internet. For example, a graphical user interface 104 may include a software program executing on a client computer system communicating with a quantity takeoff engine 102. Also, in one embodiment, the quantity takeoff engine 102 and the graphical user interface 104 may be provided as an application program (or programs) stored on computer readable media such as a CD-ROM, DVD-ROM, flash memory module, or other tangible storage media.

As shown, the computer system 100 includes, without limitation, the quantity takeoff engine 102, the graphical user interface 104, a keyboard 112, a mouse 114, a display device 116, a processor (not illustrated), a system database 106, a project database 108, and a CAD drawing 110. The quantity takeoff engine 102 may be configured to allow users interacting with the graphical user interface 104 via the keyboard 112 and the mouse 114 to generate takeoff objects containing properties (i.e., information) used to perform the quantity takeoff, such as the unit cost of construction materials, and takeoff reports detailing the estimated cost of the project.

In one embodiment, the system database 106 may include information, such as drawing information and the unit cost of labor, shared among multiple CAD projects. Further, the system database 106 may include object type history and mapping preferences that may be used by the quantity takeoff engine 102 to assign takeoff properties to the takeoff objects. The object type history records takeoff information used in previous CAD projects and the mapping preferences specify defaults values for takeoff properties. Typically, the mapping preferences will vary depending on the project type (i.e., the type and format of information available in the CAD drawing 110). Similarly, the project database 108 may also include drawing information and takeoff calculations, but it may also include project-specific data, such as project cost.

The composition of a given design project may be reflected in a collection of one or more CAD drawings 110. Illustratively, CAD drawing 110 includes a three-dimensional (3D) model 122 and one or more two-dimensional (2D) sheets 124. The 3D model 122 may represent virtually any real-world construct, for example, a construction plan for a building. In such a case, the 3D model 122 may include detailed 3D geometry representing the building, each floor of the building, and different systems for the building (e.g., electrical systems, HVAC systems, etc.). The 2D sheets 124 may be derived from the 3D model 122 and provide different views of the 3D model 122, such as plan, profile, and section views of the project. In one embodiment, the quantity takeoff engine 102 may be configured to use and generate information in the system database 106, the project database 108, and the CAD drawing 110. Accordingly, the quantity take off engine 102 and the graphical user interface 104 may include programmed routines or instructions allowing users to create, edit, load, and save elements from system database 106, the project database 108, and/or the CAD drawing 110. In the context of the present invention, for example, the graphical user interface 104 may allow users to create, edit, load, select, and save takeoff objects and takeoff reports. Those skilled in the art will recognize, however, that the components shown in FIG. 1 are simplified to highlight aspects of the present invention and that the graphical user interface 104 may include a broad variety of additional tools and features used to compose and manage the system database 106, the project database 108, and the CAD drawing 110.

Figure 2:
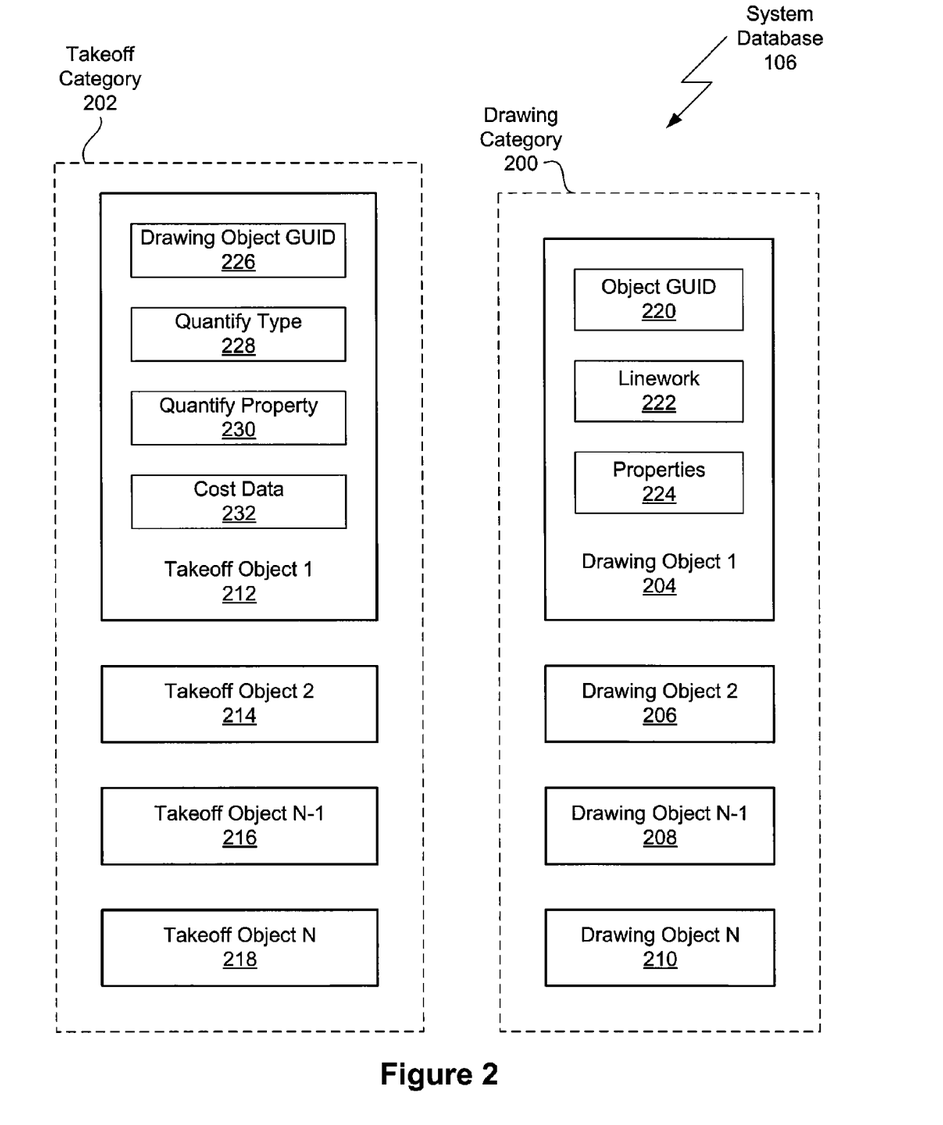
FIG. 2 is a conceptual diagram of elements of the system database of FIG. 1, according to one embodiment of the invention.

FIG. 2 is a conceptual illustration of elements in the system database 106 of FIG. 1, according to one embodiment of the invention. As shown, the system database 106 includes a drawing category 200 and a takeoff category 202. The drawing category 200 and the takeoff category 202 are used to organize data within the system database 106. Those skilled in the art will recognize, however, that the components shown in FIG. 2 are simplified to highlight aspects of the present invention and that the system database 106 may include a wide variety of organizational structures and data.

As shown, the drawing category 200 includes a drawing object 1 204, a drawing object 2 206, a drawing object N–1 208, and a drawing object N 210. Each of the drawing objects 204, 206, 208, and 210 may be created, edited, and used by various CAD tools, including the quantity takeoff engine 102 and the graphical user interface 104 of FIG. 1. Furthermore, each of the drawing objects 204, 206, 208, and 210 may define an abstract template from which specific instances, or entities, may be created. For example, the drawing object 1 200 may define a toilet object and the CAD drawing 110 of FIG. 1 may contain numerous instances of toilets, each of which inherits some data from the toilet object designated by drawing object 1 200. This hierarchy simplifies changes and ensures consistency throughout a construction project.

Illustratively, the drawing object 1 200 includes a globally unique identifier (GUID) 220, linework 222, and properties 224. The GUID 220 uniquely identifies the drawing object 1 200 to the quantity takeoff engine 102, the graphical interface 104, and any other associated CAD tools in the computer system 100 of FIG. 1. That is GUID 220 may be used to represent a common class of drawing objects in CAD drawing 110. Furthermore, GUID values may be used by other constructs, such as takeoff objects and instances of drawing object 1 200. The linework 222 may define shapes, such as points, lines, and curves that may be displayed by the graphical user interface 104. For example, the linework 222 could provide the shapes required to display a toilet in 3D views or in 2D profile, plan, or section views generated from the CAD drawing 110. The properties 224 may further define how CAD tools interact with the object 1 200 and any instances of object 1 200. The properties 224 may define metadata about a given drawing object such as width, height, weight, etc. Each of the drawing objects 206, 208, and 210 may include similar information, representing different objects that may be included in the CAD drawing 110.

The takeoff category 202 includes a takeoff object 1 212, a takeoff object 2 214, a takeoff object N–1 216, and a takeoff object N 218. The takeoff category 202 may correspond to a standard organizational system, such as CSI-16 or Uniformat. The takeoff category 202 may be used by the takeoff reporting tools 120 to organize the information in the takeoff report. Each of the takeoff objects 212, 214, 216, and 218 may correspond to a drawing object, such as drawing object 1 200, and may be created, edited, and used by various CAD tools, including the quantity takeoff engine 102 and the graphical user interface 104. For example, a takeoff object, such as takeoff object 1 212, corresponding to a toilet drawing object may be created, added to the takeoff category 202 for plumbing fixtures, and subsequently used for quantity takeoff.

As shown, the takeoff object 1 212 includes one or more corresponding GUIDs 226, a quantify type 228, a quantify property 230, and cost data 232. During a quantity takeoff process, the drawing object GUID 226 may be used to identify a particular drawing object and a corresponding set of instances to which the data in takeoff object 1 212 may be applied. The quantify type 228, the quantify property 230, and the cost data 232 may then be used to estimate the cost of each of the instances associated with the takeoff object 1 212. In one embodiment, the quantify type 228 defines the type of enumeration, such as count, linear, volume, or area, that is used to calculate the cost of each instance. And the quantify property 230 may define an instance-specific property, such as a length or a volume, corresponding to the quantify type 228. In other words, the quantify property 230 defines how the cost of a collection of instances of a given drawing element should be quantified for a takeoff report. The cost data 232 may include numerical constants, such as labor cost per unit, as well as takeoff equations used to estimate cost.

For example, the takeoff object 1 212 may be created to correspond to the drawing object of a toilet. In this example, the drawing object GUID 226 of the takeoff object 1 212 may be identical to the object GUID 220 of the drawing object corresponding to the toilet, thereby indicating that the information in the takeoff object 1 212 may be applied to all instances of the drawing object (i.e., instances of the toilet) in a given CAD drawing 110. In this case, the quantify type 228 may be set to count, indicating that the quantity to measure during takeoff is simply the number of instances of the drawing object corresponding to the toilet. Furthermore, the cost per toilet may be specified in the cost data 232. The information in takeoff object 1 212, when applied to the CAD drawing 1110, allows all instances of the toilet in CAD drawing 1 110 to be counted and the total cost of the toilets to be added to the total cost for the project represented by CAD drawing 1 110.

In alternate embodiments, each of the takeoff objects may correspond to one or more drawing objects and/or one or more instances of drawing objects. Again, the takeoff object may be created, edited, and used by various CAD tools, including the quantity takeoff engine and the graphical user interface. The granularity at which the CAD tools apply the information in the takeoff object may be determined by whether the CAD tools is applying the information in the takeoff object to a corresponding drawing object or an instance of a drawing object. The drawing object GUID may be supplemented or subsumed by a list of GUIDs which establish the correspondence between the takeoff object and the drawing object(s) and/or instances of drawing object(s).

Figure 3:
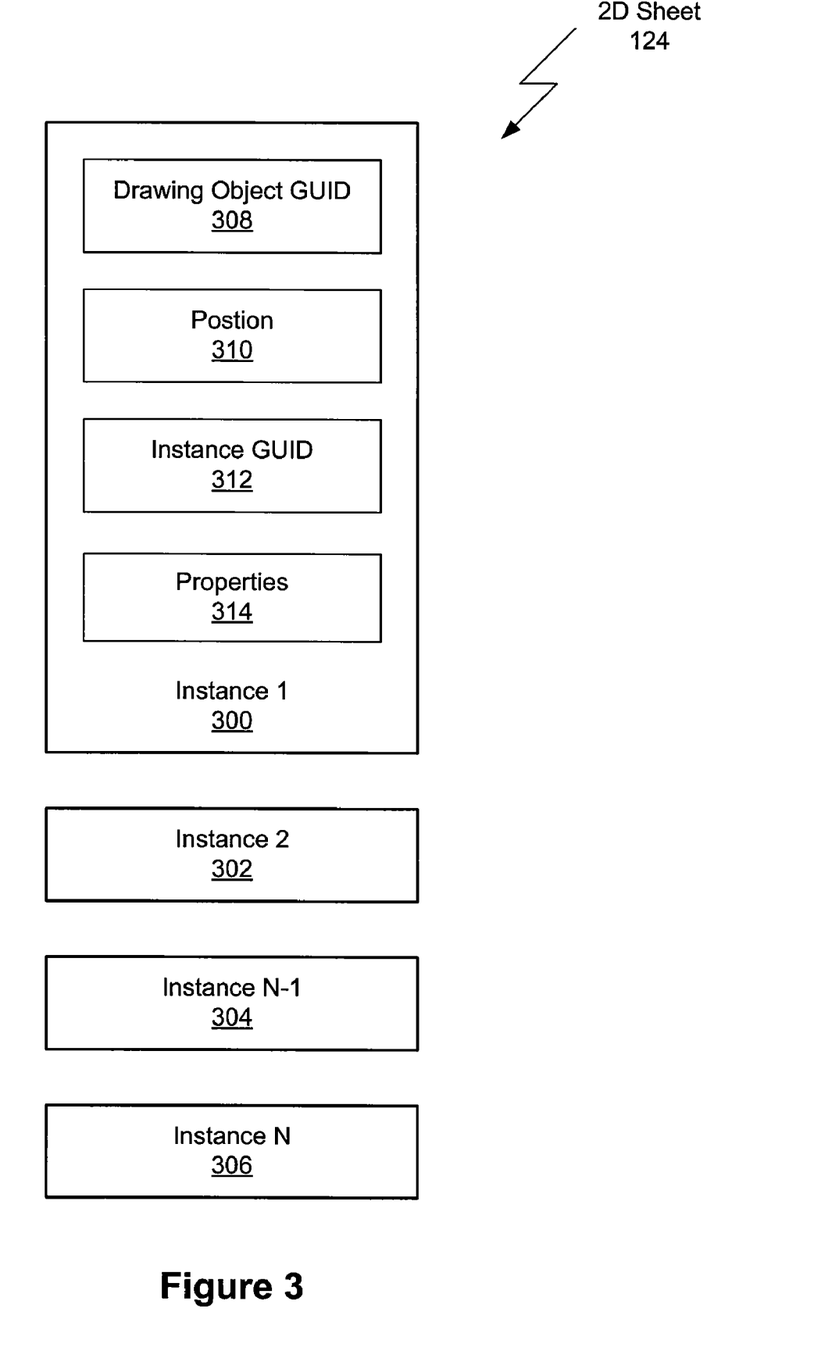
FIG. 3 is a conceptual diagram of a 2D sheet, according to one embodiment of the invention.

FIG. 3 illustrates an example of one of the 2D sheets 124 of FIG. 1, according to one embodiment of the invention. As shown, the 2D sheet 124 includes an instance 1 300 of a drawing object, an instance 2 302 of a drawing object, an instance N-1 304 of a drawing object, and an instance N 306 of a drawing object. Each of the instances 300, 302, 304, and 306 corresponds to a drawing object, such as drawing object 1 204 of FIG. 2. Each drawing object may be defined in the system database 106 of FIG. 1, the project database 108 of FIG. 1, or the CAD drawing 110 of FIG. 1.

The instance 1 300 is configured to include a drawing object GUID 308, a position 310, an instance GUID 312, and properties 314. The instance 1 300 may inherit data from the drawing object designated by the drawing object GUID 308. For example, if the drawing object corresponding to the drawing object GUID 308 defines a door, instance 1 300 will inherit the linework 222 and the properties 224 that define this door. The position 310 specifies the location of the instance 1 300 relative to other instances, such as the instance N 306, included in the CAD drawing 110. For example, the position 310 may specify a 3D coordinate location within a space represented by the 2D sheet 124. The instance GUID 312 uniquely identifies the instance 1 300 to the quantity takeoff engine 102, the graphical interface 104, and any other associated CAD tools in the computer system 100 of FIG. 1. While instance 1 300 and instance 2 302 may share the same drawing object GUID 308, thereby indicating that they are both instances of the same drawing object, instance 1 300 and instance 2 302 have different instance GUIDs 712. The properties 314 include information that is specific to each instance, as opposed to information that is shared between instances of the same object. For example, one of the properties 314 such as length or width may be used as the basis for quantifying the instance 1 300 during a quantity takeoff process. Each of the instances 302, 305, and 306 may include similar information.

Figure 4:
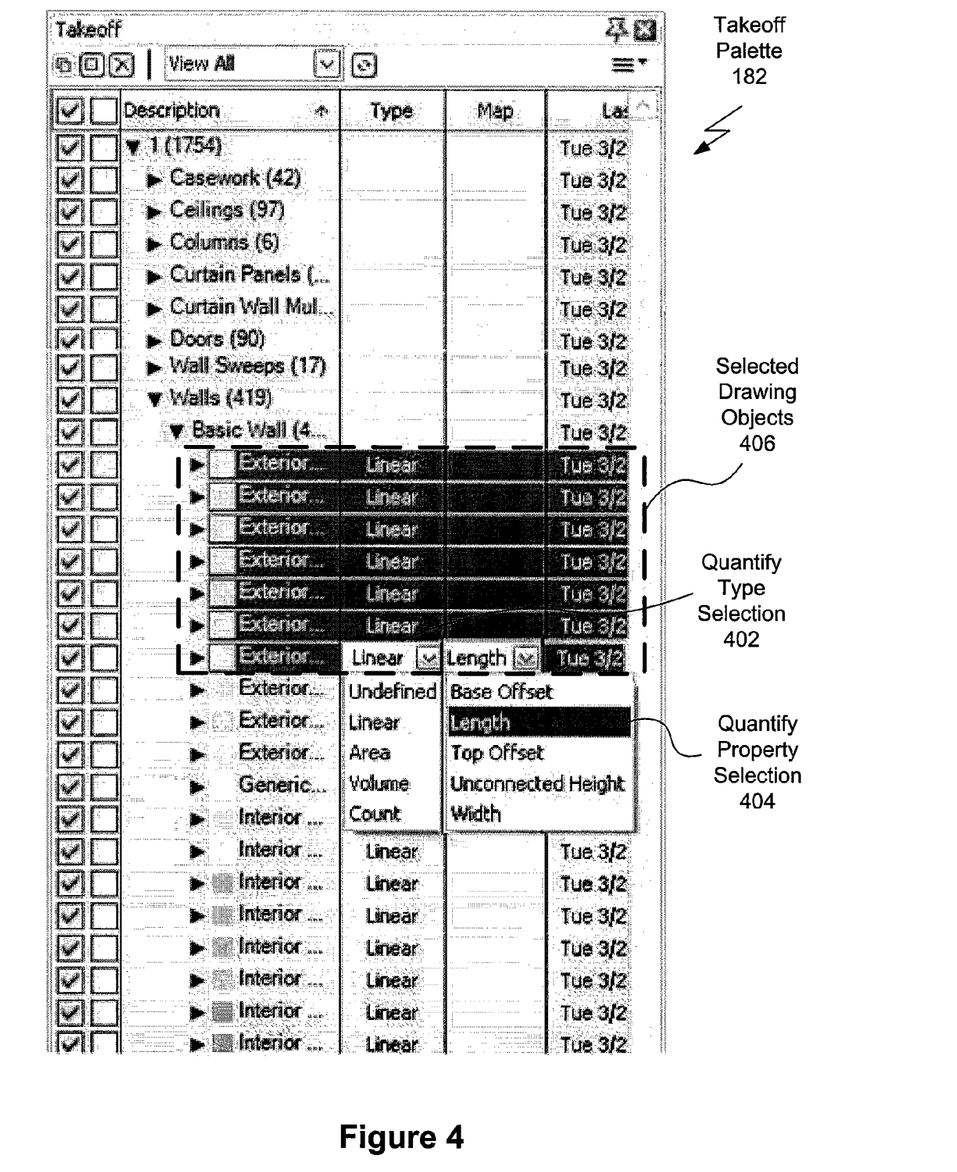
FIG. 4 illustrates an exemplary takeoff palette of FIG. 1, according to one embodiment of the invention.

FIG. 4 illustrates an exemplary takeoff palette 182 of FIG. 1, according to one embodiment of the invention. The takeoff palette 182 may be configured to allow the user to enter and to view the quantify type 228 and the quantify property 230 included in each of the takeoff objects 212, 214, 216, and 218 of FIG. 2, corresponding to the drawing objects 204, 206, 208, and 210, respectively.

As shown, under the "description" heading, the takeoff palette 182 includes drawing categories 200, such as a walls category. Within each drawing category 200, the takeoff palette 182 includes drawing objects, such as drawing objects representing various types of exterior and interior walls. Again, each drawing object corresponds to one takeoff object. Further, for each drawing object, adjacent to the drawing object description, the takeoff palette 182 displays the quantify type 228 (shown, for example, under the "type" heading) and the quantify property 230 (shown, for example, under the "map" heading) included in the takeoff object corresponding to the drawing object. The takeoff palette 182 may also be configured to display the instances of each of the drawing objects (not shown).

The quantity takeoff engine 102 is configured to populate the takeoff palette 182 using takeoff objects, object type history and mapping preferences included in the system database 106. During an automated quantity takeoff process, the quantity takeoff engine 102 attempts to map drawing objects to takeoff objects included in the system database 106. The quantity takeoff engine 102 may search for takeoff objects that correspond to drawing objects in any technically feasible fashion. For example, the quantity takeoff engine may read an object GUID included in a particular drawing object and search for a takeoff object that includes a matching drawing object GUI. For each drawing object that does not map to an existing takeoff object, the quantity takeoff engine 102 creates a takeoff object and applies the object type history and the mapping preferences. The object type history includes the names of drawing objects and corresponding quantify types specified in previous CAD projects. The quantity takeoff engine 102 attempts to pattern match the names of the drawing objects to the names of the drawing objects in the object type history. After finding a match, the quantify takeoff engine 102 assigns the corresponding quantify type included in the object type history to the quantify type 228 included in the takeoff object corresponding to the drawing object. Similarly, the quantity takeoff engine 102 uses the mapping preferences to assign a default quantify property 230 based on the quantify type 228. More specifically, if a quantify type 228 is specified but a quantify property 230 is not specified, then the quantity takeoff engine 102 assigns a default quantify property 230 based on the quantify type 228.

The takeoff palette 182 enables the user to select multiple drawing objects simultaneously, such as selected drawing objects 406, and apply a single specification to all of the takeoff objects corresponding to the selected drawing objects. In this example, the selected drawing objects 406 includes seven exterior wall drawing objects corresponding to seven takeoff objects. A user-specified quantify type selection 402 configures the quantity takeoff engine 102 to assign the specified value to the quantify types 228 included in the takeoff objects corresponding to the selected drawing objects 406. Further, the quantity takeoff engine 102 uses the mapping preferences to identify a default quantify property value based on the specified quantify type. The quantity takeoff engine 102 then assigns this default quantify property value to the quantify properties 230 included in the takeoff objects corresponding to the selected drawing objects 406. Finally, the quantify takeoff engine 102 quantifies all instances of the selected drawing objects 406, estimates costs for these quantified instances, and updates a workbook to reflect the estimated costs. In this example, the quantify type 228 may be one of undefined, linear, area, volume, or count. Illustratively, linear is selected and, therefore, the quantity takeoff engine 102 assigns linear to the quantify types 228 included in the seven takeoff objects corresponding to the selected drawing objects 406. Subsequently, the quantity takeoff engine 102 updates the quantify property 230, quantifies the instances of the selected drawing objects 406, estimates the costs, and updates the workbook accordingly.

The user may also specify a quantify property selection 404. The quantify property selection 404 configures the quantity takeoff engine 102 to assign the specified value to the quantify properties 230 included in the takeoff objects corresponding to the selected drawing objects 406. The quantify takeoff engine 102 then quantifies all instances of the selected drawing objects 406, estimates costs for these quantified instances, and updates the workbook to reflect the estimated costs. To facilitate the specification of the quantify property 230, the quantity takeoff engine 102 configures the takeoff palette 182 to present a list of instance-specific properties that may be quantified using the current quantify type 228. In this example, the quantify property 230 may be one of base offset, length, top offset, unconnected height, or width. Illustratively, length is selected, consequently, when the quantity takeoff engine 102 performs quantity takeoff on the selected drawing objects 406, the length property of the instances of the selected drawing objects 406 are the basis of a cost estimate.

Figure 5:
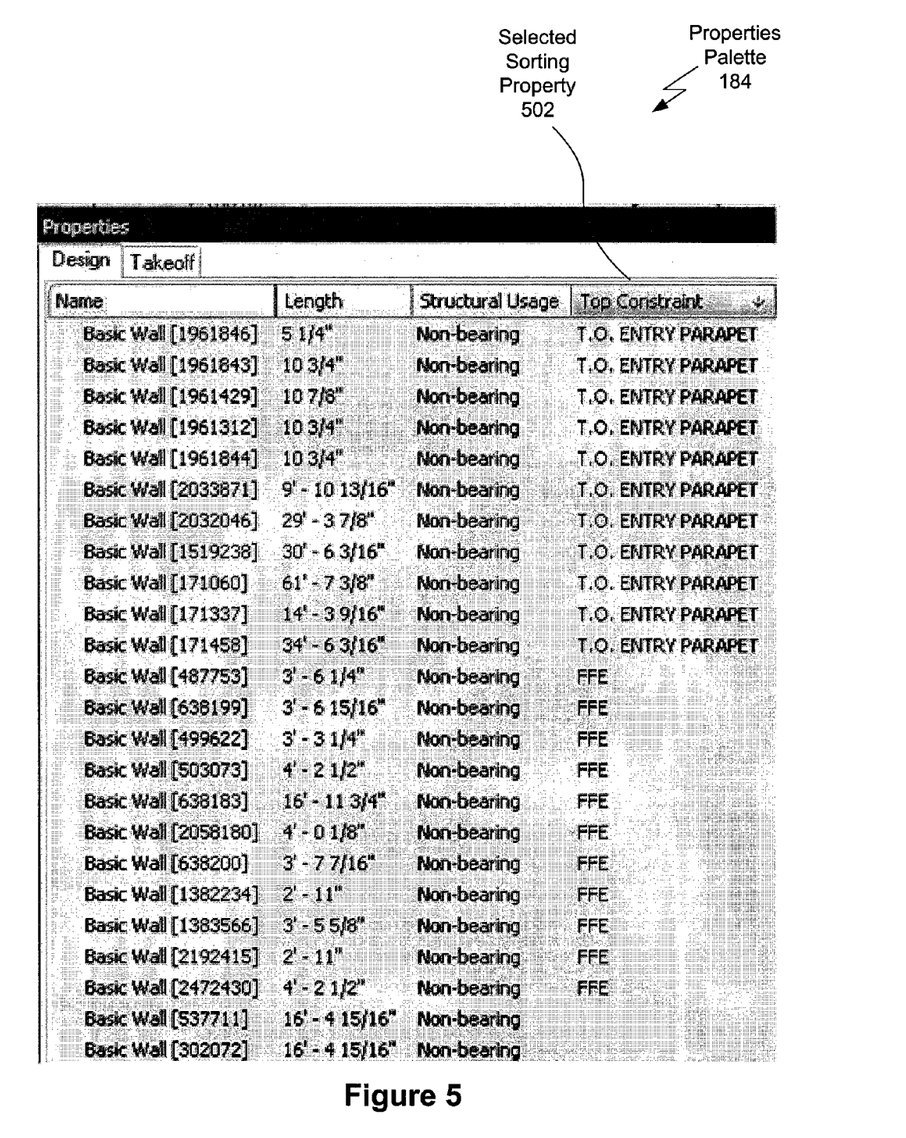
FIG. 5 illustrates an exemplary properties palette of FIG. 1, according to one embodiment of the invention.

FIG. 5 illustrates an exemplary properties palette 184 of FIG. 1, according to one embodiment of the invention. The properties palette 184 is configured to allow the user to view, manipulate (e.g., sort, filter, etc.), and select one or more instances of one or more drawing objects. As shown, the properties palette 184 includes two selectable tabs: design and takeoff. Illustratively, the design tab is selected. If the design tab is selected, then the properties palette 184 displays instance-specific values of design properties, such as length. Similarly, if the takeoff tab is selected, then the properties palette 184 displays instance-specific values of takeoff properties, such as cost. In alternate embodiments, the properties palette may be configured to display instances of drawing objects and/or drawing objects.

The properties palette 184 enables the user to select one or more instances of one or more drawing objects simultaneously. Further, the graphical user interface 104 configures the properties palette 184 and the takeoff palette 182 to work together. More specifically, after selecting one or more drawing objects and/or one or more instance of drawing objects using the takeoff palette 182, the graphical user interface 104 populates the properties palette 184 with all of the instances of the selected drawing objects and the selected instances of drawing objects. Similarly, the user may select one or more instances of drawing objects, not shown, using the properties palette 184, and the graphical user interface 104 automatically selects the same instances of drawing objects in the takeoff palette 182. Further, the user may select one or more instances of one or more drawing objects in the properties palette 184 and create a new drawing object and associated takeoff object that represent all of the selected instances. Both the takeoff palette 182 and the properties palette 184 support selection of non-homogeneous instances. In other words, the user may select one or more instances of different drawing objects and/or one or more drawing objects belonging to different drawing categories. Further, the user may select instances of drawing objects, drawing objects, or any combination thereof.

The properties palette 184 includes a variety of tools that facilitate the viewing, filtering, and sorting of design properties and takeoff properties associated with the instances of the drawing objects. Selecting, viewing, filtering, and sorting this information facilitates efficient analysis of the CAD drawing 110. Illustratively, a selected sorting property 502 is specified as a top constraint property. Consequently, the graphics user interface 104 sorts the instances displayed in the properties palette 184 according to the instance-specific top constraint property. Further, the user may select one of more of the instances and create a new drawing object and corresponding takeoff object that represent the selected instances. For example, the user may select the eleven instances with a top constraint property of "T. O. Entry Parapet" and, subsequently, create a new drawing object and corresponding takeoff object that represent these eleven instances.

Those skilled in the art will recognize that the components shown in FIG. 5 are simplified to highlight aspects of the present invention and that the properties palette 184 may include a broad variety of additional tools and features used to compose and manage the drawing objects and the instances of the drawing objects included in the CAD drawing 110.

Figure 6A:
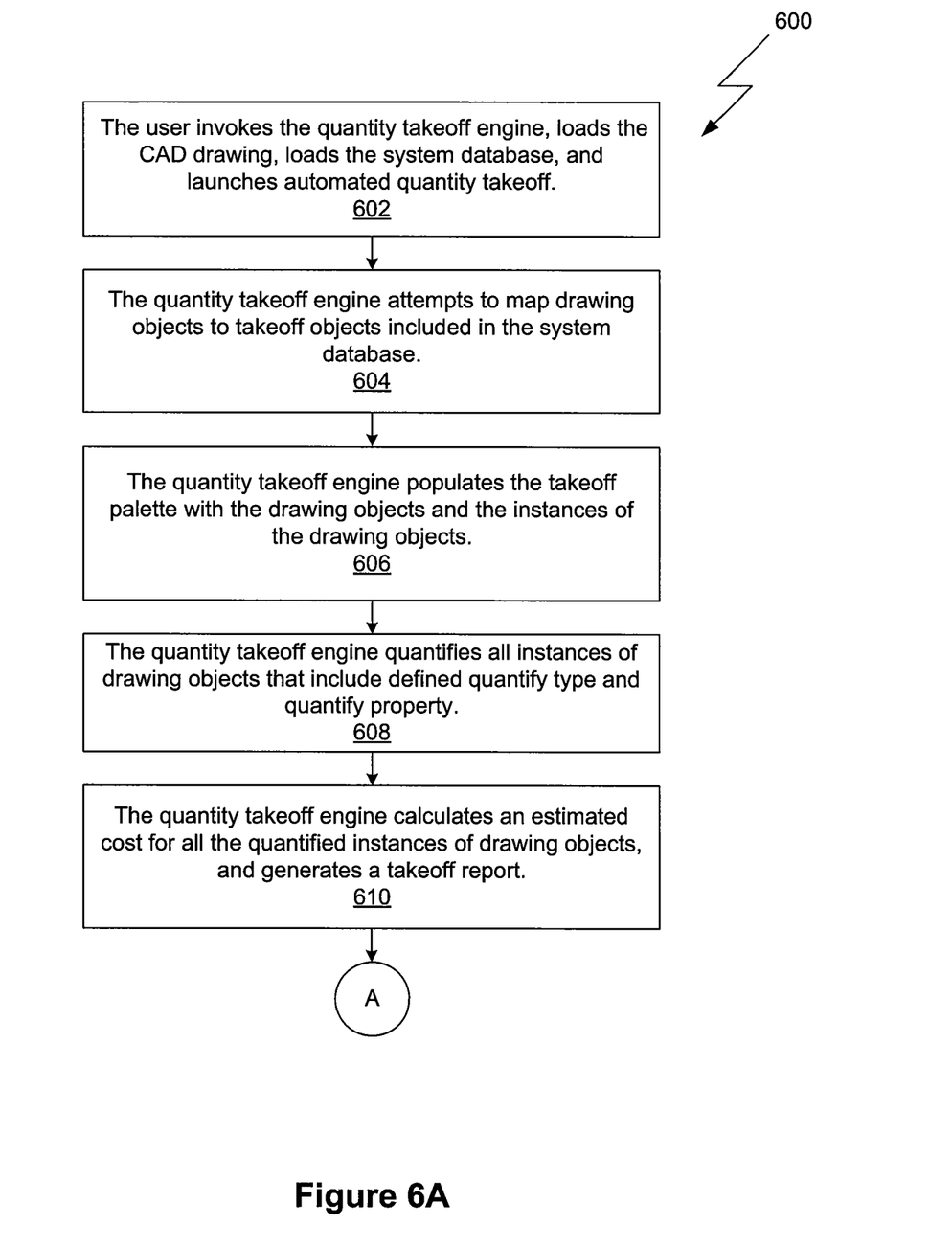
FIGS. 6A and 6B are a flow diagram of method steps for generating a takeoff report, according to one embodiment of the invention.
Figure 6B:
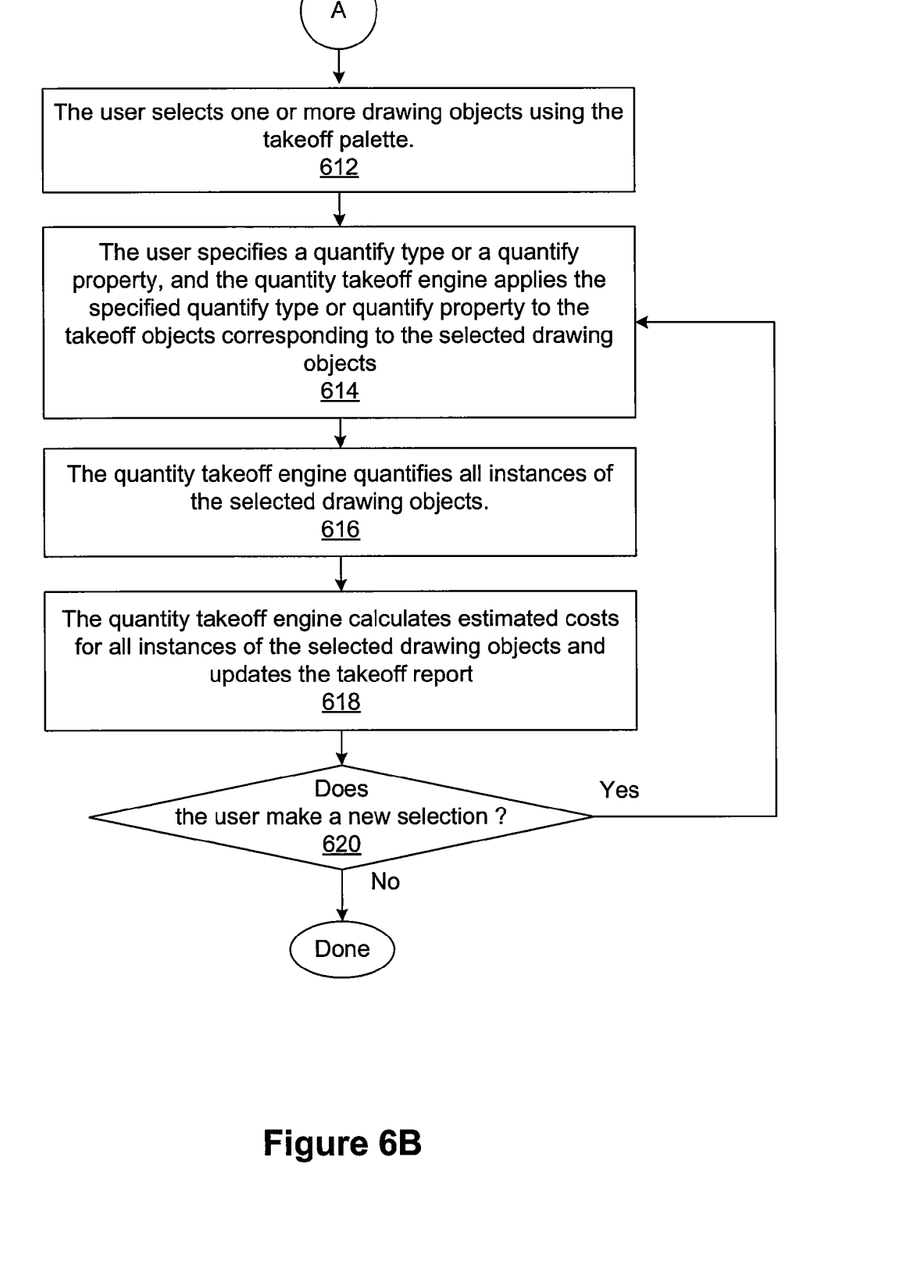

FIGS. 6A and 6B is a flow diagram of method steps for generating a takeoff report, according to one embodiment of the invention. Although the method 600 is described in conjunction with the systems of FIGS. 1-5, persons skilled in the art will understand that any system that performs the steps of the method 600, in any order, is within the scope of the invention.

As shown, the method 600 begins at step 602, where the quantity takeoff engine 102 is involved, the CAD drawing 110 is loaded, the system database 106 is loaded, and automated quantity takeoff is launched. At step 604, the quantity takeoff engine 102 attempts to map drawing objects to takeoff objects included in the system database 106. The quantity takeoff engine 102 may search for takeoff objects that correspond to drawing objects in any technically feasible fashion. For example, the quantity takeoff engine may read an object GUID included in a particular drawing object and search for a takeoff object that includes a matching drawing object GUI. Alternatively, the quantity takeoff engine may use pattern matching based on the name of the drawing object to select a corresponding takeoff object.

At step 606, the quantity takeoff engine 102 populates the takeoff palette 182 with the drawing objects and the instances of the drawing objects included in the CAD drawing 110. As part of step 606, the quantity takeoff engine 102 creates takeoff objects corresponding to drawing objects that are not mapped to previously defined takeoff objects. Further, the quantity takeoff engine 102 uses the object type history and the mapping preferences included in the system database 106 to assign the quantify type 228 and the quantify property 230 to these takeoff objects. If the quantity takeoff engine 102 does not identify a previous or default value for the quantify type 228 and/or the quantify property 230 corresponding to a particular drawing object, then the quantity takeoff engine 102 sets the quantify type 228 and/or the quantify property 230 included in the corresponding takeoff object to undefined.

At step 608, the quantity takeoff engine 102 quantifies all instances of drawing objects that include a defined quantify type 228 and a defined quantify property 230. More specifically, for each drawing object, the quantity takeoff engine 102 uses the quantify type 228, the quantify property 230, and any additional measurement calculations included in the corresponding takeoff object, in conjunction with the instance-specific values of the quantify property 230, to quantify the instances of the drawing object. For example, the quantity takeoff engine may quantify a dry wall instance by dividing a specified wall length property by a constant linear length representing the length of a dry wall panel to determine a count of dry wall panels. At step 610, the quantity takeoff engine 102 uses the cost data 232 included in the takeoff objects to calculate an estimated cost for all of the quantified instances in the CAD drawing 110. Subsequently, the quantity takeoff engine 102 generates a takeoff report that includes these estimated costs.

At step 612, the user selects one or more drawing objects using the takeoff palette. At step 614, the user specifies a quantify type 228 or a quantify property 240. The quantity takeoff engine 102 applies the specified quantify type 228 or quantify value 230 to the takeoff objects corresponding to the selected drawing objects. As part of step 612, if the user specifies a quantify type 228, then the quantity takeoff engine 102 uses the mapping preferences included in the system database 106 to assign a default quantity property 230 based on the specified quantify type 228 to the takeoff objects corresponding to the selected drawing objects.

At step 616, the quantity takeoff engine 102 quantifies all instances of the selected drawing objects. At step 618, the quantity takeoff engine 102 uses the cost data 232 included in the takeoff objects to calculate an estimated cost for all instances of the selected drawing objects. Subsequently, the quantity takeoff engine 102 updates a workbook to reflect these estimated costs. At step 620, if the graphical user interface 104 determines that the user makes a new selection of one or more drawing objects using the takeoff palette 182, then the method 600 returns to step 614, where the user specifies a quantify type 228 or a quantify property 230. The method 600 proceeds in this fashion, looping through steps 614-620, until the user does not select any instances. The method 600 then terminates.

Figure 7:
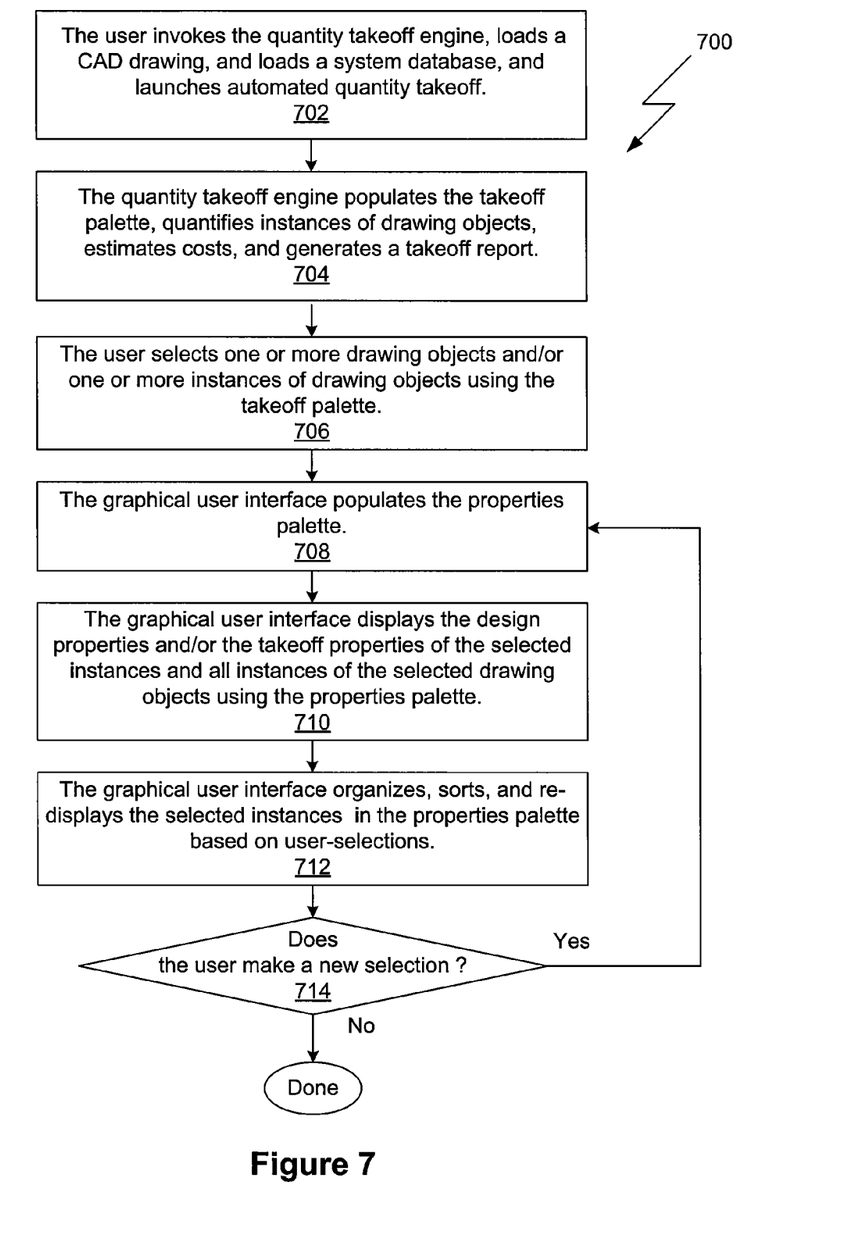
FIG. 7 is a flow diagram of method steps for displaying properties associated with instances of the drawing objects, according to one embodiment of the invention.

FIG. 7 is a flow diagram of method steps for displaying properties associated with instances of the drawing objects. Although the method 700 is described in conjunction with the systems of FIGS. 1-5, persons skilled in the art will understand that any system that performs the steps of the method 700, in any order, is within the scope of the invention.

As shown, the method 700 begins at step 702, where the quantity takeoff engine 102 is involved, the CAD drawing 110 is loaded, the system database 106 is loaded, and automated quantity takeoff is launched. At step 704, the quantity takeoff engine 102 populates the takeoff palette 182 with the drawing objects and the instances of the drawing objects included in the CAD drawing 110. Further, the quantity takeoff engine 102 quantifies instances of drawing objects, estimates costs, and generates the workbook. At step 706, the user selects one or more drawing objects and/or one or more instances of drawing objects using the takeoff palette 182. At step 708, the user requests that the graphical user interface 104 populate the properties palette 184. At step 710, the graphical user interface 104 displays the properties of the selected instances and all instances of the selected drawing objects using the properties palette 184. The displayed properties may include instance-specific design properties (e.g., length), instance-specific takeoff properties (e.g., cost), or any combination thereof. At step 712, the graphical user interface 104 organizes, sorts, and re-displays the selected instances in the properties palette 184 based on user-selections. For example, the user may configure the properties palette to sort the selected instances according to the values of the instance-specific length property. At step 714, if the graphical user interface 104 determines that the user makes a new selection of one or more drawing objects using the takeoff palette 182, then the method 700 returns to step 708, where the user requests that the graphical user interface 104 populate the properties palette. The method 700 proceeds in this fashion, looping through steps 708-714, until the user does not select any instances. The method 700 then terminates.

In sum, the takeoff process used to generate estimated costs for a construction process is facilitated by enabling the simultaneous selection and access of multiple drawing objects and/or instances of drawing objects in a CAD drawing. In some embodiments, the user first executes an automated quantity takeoff. During the automated quantity takeoff, the quantity takeoff engine maps instances of drawing objects to takeoff objects that are defined in the system database, quantifies the instances associated with the defined takeoff objects, performs takeoff calculations, and generates a workbook. Also during the automated quantity takeoff, the quantity takeoff engine populates a takeoff palette. After the automated quantity takeoff is completed, the user may select one or more drawing objects from the takeoff palette and simultaneously modify the quantify type (e.g., count, linear, area, etc.) and/or quantify property (e.g. length). If the user does not define a quantify property, then the quantity takeoff engine will assign a default quantify property based on a properties mapping included in the system database. Subsequently, the quantify takeoff engine automatically quantifies the instances associated with the selected drawing objects, performs takeoff calculations, and updates the takeoff report. In addition to viewing the data in the takeoff report, the user may analyze the CAD drawing using a properties palette. The user simultaneously selects one or more drawing objects and/or one or more instances of drawing objects from the takeoff palette. The graphical user interface then displays and allows the user to organize (e.g., filter, search, etc.) the design properties and the takeoff properties associated with the selections in the properties palette.

Advantageously, by enabling the user to select multiple drawing objects and/or instances of drawing objects and subsequently apply commands to all of the selections simultaneously, the quantity takeoff engine and the graphical user interface streamline the takeoff design process. Furthermore, automatically performing takeoff on the instances associated with selected drawing objects reduces the time required to perform takeoff measurements and facilitates an incremental, interactive design approach that is favored by some users. Finally, by enabling the user to intelligently select, display, and organize instances of drawing objects using the properties palette, the graphical user interface facilitates quickly and accurately assessing the impact of different design choices While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for performing quantity takeoff computations, the method comprising:
   receiving a selection of a drawing object, wherein at least one instance of the selected drawing object is included in a computer-aided design (CAD) drawing, and the selected drawing object is associated with a drawing category;
   determining a takeoff object associated with the selected drawing object, wherein the takeoff object is associated with a quantify type;
   referencing a database to generate a list of one or more quantify properties based on the quantify type;
   displaying a hierarchical takeoff palette that includes the drawing category associated with the selected drawing object, wherein each instance of the selected drawing object is shown as a sub-element to the drawing category;
   receiving a selection of a quantify property from the list of one or more quantify properties via the hierarchical takeoff palette;
   generating a quantified value for each instance of the selected drawing object based on both the quantify type and the selected quantify property; and
   computing a cost estimate for each instance of the selected drawing object based on the quantified value for the instance and cost data included in the takeoff object,
   wherein one or more of the steps of receiving a selection of a drawing object, determining, referencing, displaying, receiving a selection of a quantify property, generating and computing are performed by a processor.

2. The method of claim 1, wherein the selected drawing object is included in the hierarchical takeoff palette.

3. The method of claim 2, wherein the quantify type and the list of one or more quantify properties are included in the hierarchical takeoff palette.

4. The method of claim 1, wherein the quantify type is one of an undefined measurement, a linear measurement, an area measurement, a volume measurement, and a count of the drawing object.

5. The method of claim 1, wherein each quantify property is one of a base offset measurement, a length measurement, a top offset measurement, an unconnected height measurement, and a width measurement of the drawing object.

6. The method of claim 4, wherein, if the quantify type is an undefined measurement, then historical mapping preferences stored in the database are referenced to determine an appropriate quantify type.

7. The method of claim 6, wherein the historical mapping preferences are further referenced to automatically select a quantify property.

8. The method of claim 1, further comprising the step of updating a cumulative cost estimate to reflect the computed cost estimate for each instance of the selected drawing object.

9. The method of claim 8, further comprising the step of updating a workbook to reflect the updated cumulative cost estimate and the computed cost estimate for each instance of the selected drawing object.

10. A computer-readable medium including instructions that, when executed by a processor, cause the processor to perform quantity takeoff calculations by performing the steps of:
    receiving a selection of a drawing object, wherein at least one instance of the selected drawing object is included in a computer-aided design (CAD) drawing, and the selected drawing object is associated with a drawing category;
    determining a takeoff object associated with the selected drawing object, wherein the takeoff object is associated with a quantify type;
    generating a list of one or more quantify properties based on the quantify type;
    displaying a hierarchical takeoff palette that includes the drawing category associated with the selected drawing object, wherein each instance of the selected drawing object is shown as a sub-element to the drawing category;
    receiving a selection of a quantify property from the list of one or more quantify properties via the hierarchical takeoff palette;
    generating a quantified value for each instance of the selected drawing object based on both the quantify type and the selected quantify property; and
    computing a cost estimate for each instance of the selected drawing object based on the quantified value for the instance and cost data included in the takeoff object.

11. The computer-readable medium of claim 10, wherein the selected drawing object is included in the hierarchical takeoff palette.

12. The computer-readable medium of claim 11, wherein the quantify type and the list of one or more quantify properties are included in the hierarchical takeoff palette.

13. The computer-readable medium of claim 10, wherein the quantify type is one of an undefined measurement, a linear measurement, an area measurement, a volume measurement, and a count of the drawing object.

14. The computer-readable medium of claim 13, wherein each quantify property is one of a base offset measurement, a length measurement, a top offset measurement, an unconnected height measurement, and a width measurement of the drawing object.

15. The computer-readable medium of claim 13, wherein, if the quantify type is an undefined measurement, then historical mapping preferences stored in a database are referenced to determine an appropriate quantify type.

16. The computer-readable medium of claim 15, wherein the historical mapping preferences are further referenced to automatically select a quantify property.

17. The computer-readable medium of claim 10, further comprising the step of updating a cumulative cost estimate to reflect the computed cost estimate for each instance of the selected drawing object.

18. The computer-readable medium of claim 17, further comprising the step of updating a workbook to reflect the updated cumulative cost estimate and the computed cost estimate for each instance of the selected drawing object.

19. A computer system configured to perform quantity takeoff calculations, the computer system comprising:
- a processor; and
- a memory coupled to the processor and including a quantity takeoff engine configured to:
  - receive a selection of a drawing object, wherein at least one instance of the selected drawing object is included in a computer-aided design (CAD) drawing, and the selected drawing object is associated with a drawing category,
  - determine a takeoff object associated with the selected drawing object, wherein the takeoff object is associated with a quantify type,
  - generate a list of one or more quantify properties based on the quantify type,
  - display a hierarchical takeoff palette that includes the drawing category associated with the selected drawing object, wherein each instance of the selected drawing object is shown as a sub-element to the drawing category;
  - receive a selection of a quantify property from the list of one or more quantify properties via the hierarchical takeoff palette,
  - generate a quantified value for each instance of the selected drawing object based on both the quantify type and the selected quantify property, and
  - compute a cost estimate for each instance of the selected drawing object based on the quantified value for the instance and cost data included in the takeoff object.

20. The computer system of claim 19, wherein the selected drawing object, quantify type and the list of one or more quantify properties are included in the hierarchical takeoff palette.

* * * * *